(12) United States Patent
Zhong et al.

(10) Patent No.: US 12,272,987 B2
(45) Date of Patent: Apr. 8, 2025

(54) ELECTRICALLY-DRIVEN PUMPING SYSTEM AND DRIVING METHOD THEREOF

(71) Applicant: YANTAI JEREH PETROLEUM EQUIPMENT & TECHNOLOGIES CO., LTD., Yantai (CN)

(72) Inventors: Jifeng Zhong, Yantai (CN); Liang Lv, Yantai (CN); Shuzhen Cui, Yantai (CN); Yipeng Wu, Yantai (CN); Xincheng Li, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/774,815

(22) PCT Filed: Feb. 15, 2022

(86) PCT No.: PCT/CN2022/076321
§ 371 (c)(1),
(2) Date: May 5, 2022

(87) PCT Pub. No.: WO2023/155038
PCT Pub. Date: Aug. 24, 2023

(65) Prior Publication Data
US 2024/0162738 A1 May 16, 2024

(51) Int. Cl.
*H02J 7/14* (2006.01)
*F04B 17/03* (2006.01)
(Continued)

(52) U.S. Cl.
CPC ............ *H02J 7/1415* (2013.01); *F04B 17/03* (2013.01); *H02J 9/08* (2013.01); *H02P 27/06* (2013.01)

(58) Field of Classification Search
CPC ........................................................ H02P 27/06
See application file for complete search history.

(56) References Cited

U.S. PATENT DOCUMENTS 3,794,377 A  2/1974  Wachsmuth et al.
3,815,965 A  6/1974  Ostwald
(Continued)

FOREIGN PATENT DOCUMENTS

CN  1154765 A  7/1997
CN  102494894 A  6/2012
(Continued)

OTHER PUBLICATIONS

Non-Final Office Action for U.S. Appl. No. 17/747,916 mailed on Aug. 18, 2022.
(Continued)

*Primary Examiner* — Daniel Kessie
(74) *Attorney, Agent, or Firm* — Sheppard Mullin Richter & Hampton LLP (57) ABSTRACT

An electrically-driven pumping system and a driving method thereof. The electrically-driven pumping system includes: a power generation device, at least one energy storage system, a main motor, a pumping device, an auxiliary device, and a first transformer. The first transformer includes an input end, a first output end, and a second output end, the power generation device is connected to the energy storage unit, the input end of the first transformer is connected to the energy storage unit, the first output end of the first transformer is electrically connected to the main motor, and the second output end of the first transformer is electrically connected to the auxiliary device.

20 Claims, 3 Drawing Sheets (51) Int. Cl.
 *H02J 9/08* (2006.01)
 *H02P 27/06* (2006.01)

(56) References Cited

U.S. PATENT DOCUMENTS

| | | | |
|---|---|---|---|
| 4,201,523 A | 5/1980 | Olofsson | |
| 4,793,775 A | 12/1988 | Peruzzi | |
| 5,282,722 A | 2/1994 | Beatty | |
| 5,519,300 A | 5/1996 | Leon et al. | |
| 5,767,591 A | 6/1998 | Pinkerton | |
| 5,846,056 A | 12/1998 | Dhindsa et al. | |
| 6,035,265 A | 3/2000 | Dister et al. | |
| 6,134,878 A | 10/2000 | Amako et al. | |
| 7,036,310 B2 | 5/2006 | Aoki et al. | |
| 8,731,793 B2 | 5/2014 | Barbir et al. | |
| 9,316,676 B2 | 4/2016 | Dayan | |
| 10,648,311 B2 | 5/2020 | Oehring et al. | |
| 10,865,624 B1 | 12/2020 | Cui et al. | |
| 10,873,099 B1 | 12/2020 | Gurunathan et al. | |
| 10,914,155 B2 | 2/2021 | Oehring et al. | |
| 10,989,180 B2 | 4/2021 | Yeung et al. | |
| 11,109,508 B1 | 8/2021 | Yeung et al. | |
| 11,125,066 B1 | 9/2021 | Yeung et al. | |
| 11,208,878 B2 | 12/2021 | Oehring et al. | |
| 11,220,895 B1 | 1/2022 | Yeung et al. | |
| 11,236,739 B2 | 2/2022 | Yeung et al. | |
| 11,378,008 B2 | 7/2022 | Yeung et al. | |
| 11,391,136 B2 | 7/2022 | Coli et al. | |
| 11,434,737 B2 | 9/2022 | Oehring et al. | |
| 11,459,863 B2 | 10/2022 | Robinson et al. | |
| 11,530,602 B2 | 12/2022 | Yeung et al. | |
| 11,542,786 B2 | 1/2023 | Hinderliter et al. | |
| 11,578,580 B2 | 2/2023 | Oehring et al. | |
| 11,629,584 B2 | 4/2023 | Yeung et al. | |
| 11,859,482 B2 | 1/2024 | Yeung et al. | |
| 12,065,968 B2 | 8/2024 | Yeung et al. | |
| 12,084,952 B2 | 9/2024 | Robinson et al. | |
| 12,116,875 B2 | 10/2024 | Oehring et al. | |
| 2003/0007369 A1 | 1/2003 | Gilbreth et al. | |
| 2003/0064858 A1 | 4/2003 | Saeki et al. | |
| 2004/0182652 A1* | 9/2004 | Ammon | B66B 11/043 187/277 |
| 2005/0093496 A1 | 5/2005 | Tokunou et al. | |
| 2005/0241884 A1 | 11/2005 | Ghanemi et al. | |
| 2010/0045237 A1 | 2/2010 | Liu | |
| 2010/0135840 A1 | 6/2010 | Fujimoto et al. | |
| 2011/0061411 A1 | 3/2011 | Kim et al. | |
| 2012/0153935 A1 | 6/2012 | Gao et al. | |
| 2012/0326668 A1 | 12/2012 | Ballatine et al. | |
| 2013/0030742 A1 | 1/2013 | Banerjee et al. | |
| 2013/0049733 A1 | 2/2013 | Neti et al. | |
| 2013/0184884 A1 | 7/2013 | More et al. | |
| 2013/0228345 A1* | 9/2013 | Aho | A62C 99/0072 169/43 |
| 2013/0255153 A1 | 10/2013 | Sasaki et al. | |
| 2014/0049285 A1 | 2/2014 | Rodriguez | |
| 2014/0167810 A1 | 6/2014 | Neti et al. | |
| 2014/0219824 A1 | 8/2014 | Burnette | |
| 2015/0061383 A1* | 3/2015 | Kobayashi | B60K 6/48 180/65.28 |
| 2015/0260794 A1 | 9/2015 | Athikessavan et al. | |
| 2015/0349387 A1 | 12/2015 | Inaba et al. | |
| 2016/0041066 A1 | 2/2016 | Patenaude et al. | |
| 2016/0121871 A1 | 5/2016 | Lee | |
| 2016/0215769 A1* | 7/2016 | Haapanen | E21B 43/128 |
| 2016/0358311 A1 | 12/2016 | Chen et al. | |
| 2017/0159425 A1 | 6/2017 | Wood et al. | |
| 2017/0285062 A1 | 10/2017 | Kim | |
| 2017/0292789 A1 | 10/2017 | Hjorth et al. | |
| 2018/0145511 A1 | 5/2018 | Biellmann | |
| 2018/0328157 A1 | 11/2018 | Bishop | |
| 2019/0100989 A1 | 4/2019 | Stewart et al. | |
| 2019/0128265 A1 | 5/2019 | Washio et al. | |
| 2019/0169971 A1 | 6/2019 | Oehring et al. | |
| 2019/0195292 A1 | 6/2019 | Pan et al. | |
| 2020/0040878 A1 | 2/2020 | Morris | |
| 2020/0049136 A1 | 2/2020 | Stephenson | |
| 2020/0109616 A1 | 4/2020 | Oehring et al. | |
| 2020/0109617 A1 | 4/2020 | Oehring et al. | |
| 2020/0325760 A1 | 10/2020 | Markham | |
| 2021/0040830 A1 | 2/2021 | Mu et al. | |
| 2021/0040836 A1 | 2/2021 | Baskin | |
| 2021/0079902 A1 | 3/2021 | Yeung et al. | |
| 2021/0095552 A1 | 4/2021 | Oehring et al. | |
| 2021/0095648 A1 | 4/2021 | Buckley et al. | |
| 2021/0102451 A1 | 4/2021 | Robinson et al. | |
| 2021/0102530 A1 | 4/2021 | Pruitt et al. | |
| 2021/0108489 A1* | 4/2021 | Shampine | E21B 41/0085 |
| 2021/0199161 A1 | 7/2021 | Eto et al. | |
| 2021/0207588 A1 | 7/2021 | Yeung et al. | |
| 2021/0310341 A1 | 10/2021 | Sherman et al. | |
| 2022/0004179 A1 | 1/2022 | Badkoubeh | |
| 2022/0018232 A1 | 1/2022 | Oehring et al. | |
| 2022/0112889 A1 | 4/2022 | Yeung et al. | |
| 2022/0112892 A1 | 4/2022 | Cui et al. | |
| 2022/0213777 A1 | 7/2022 | Cui et al. | |
| 2022/0364448 A1 | 11/2022 | Oehring et al. | |
| 2023/0055844 A1 | 2/2023 | Yeung et al. | |
| 2023/0146951 A1 | 5/2023 | Robinson et al. | |
| 2023/0203927 A1 | 6/2023 | Yeung et al. | |
| 2023/0272699 A1 | 8/2023 | Oehring et al. | |
| 2023/0296050 A1 | 9/2023 | Yeung et al. | |
| 2024/0084680 A1 | 3/2024 | Robinson et al. | |
| 2024/0093583 A1 | 3/2024 | Yeung et al. | |
| 2024/0295191 A1 | 9/2024 | Yeung et al. | |
| 2024/0392666 A1 | 11/2024 | Robinson et al. | |

FOREIGN PATENT DOCUMENTS

| | | |
|---|---|---|
| CN | 102704895 A | 10/2012 |
| CN | 103456141 A | 12/2013 |
| CN | 103913193 A | 7/2014 |
| CN | 105337397 A | 2/2016 |
| CN | 105352588 A | 2/2016 |
| CN | 105973621 A | 9/2016 |
| CN | 107345857 A | 11/2017 |
| CN | 108360818 A | 8/2018 |
| CN | 208283527 U | 12/2018 |
| CN | 208337176 U | 1/2019 |
| CN | 109765484 A | 5/2019 |
| CN | 110794032 A | 2/2020 |
| CN | 110932362 A | 3/2020 |
| CN | 111173500 A | 5/2020 |
| CN | 210745048 U | 6/2020 |
| CN | 111650514 A | 9/2020 |
| CN | 111679187 A | 9/2020 |
| CN | 112993965 A | 6/2021 |
| CN | 113417737 A | 9/2021 |
| CN | 214227909 U | 9/2021 |
| CN | 214786070 U | 11/2021 |
| CN | 215621353 U | 1/2022 |
| EP | 2290776 A1 | 3/2011 |
| KR | 20210087308 A | 7/2021 |

OTHER PUBLICATIONS

Non-Final Office Action for U.S. Appl. No. 17/155,966 mailed on Jul. 28, 2022.
Non-Final Office Action for U.S. Appl. No. 17/733,922 mailed on Sep. 21, 2022.
Non-Final Office Action for U.S. Appl. No. 17/167,391 mailed on Feb. 17, 2023.
Non-Final Office Action for U.S. Appl. No. 18/360,678 mailed on Feb. 28, 2024.
Written Opinion and International Search Report for PCT Application No. PCT/CN2022/076321 mailed on Nov. 16, 2022.
Final Office Action for U.S. Appl. No. 17/747,916 mailed on Nov. 10, 2022.
Non-Final Office Action for U.S. Appl. No. 17/884,358 mailed on Dec. 8, 2022.
Final Office Action for U.S. Appl. No. 17/733,922 mailed on Dec. 28, 2022.

(56) References Cited

OTHER PUBLICATIONS

International Search Report dated Aug. 13, 2021, for International Application No. PCT/CN2020/137300, 5 pages.
International Search Report dated Aug. 23, 2021, for International Application No. PCT/CN2020/137135, 4 pages.
Non-Final Office Action for U.S. Appl. No. 18/313,088 mailed on Mar. 28, 2024.
Non-Final Office Action for U.S. Application No. 18/303, 181 mailed on Apr. 30, 2024.
Examination Report for Canadian Patent Application No. 3157232 mailed on Jun. 20, 2024.
First Office Action for Chinese Application No. 202011273318.9 mailed on Sep. 2, 2024.
First Search for Chinese Application No. 202011273318.9 mailed on Aug. 27, 2024.
International Preliminary Report on Patentability Chapter I for International Application No. PCT/CN2022/076321 mailed on Aug. 29, 2024.
Notice of Allowance for U.S. Appl. No. 18/303,181 mailed on Aug. 21, 2024.
Notice of Allowance for U.S. Appl. No. 18/313,088 mailed on Aug. 23, 2024.
Notice of Allowance for U.S. Appl. No. 18/360,678 mailed on Aug. 20, 2024.
Second Office Action for Chinese Application No. 202011273318.9 mailed on Nov. 18, 2024.
Supplemental Search Report for Chinese Application No. 202011273318.9 mailed on Oct. 30, 2024.
Notice of Allowance for U.S. Appl. No. 18/311,042 mailed on Sep. 27, 2024.
Notice of Allowance for U.S. Appl. No. 18/643,904 mailed on Feb. 4, 2025.

* cited by examiner

| controlling the power generation device to be in a state of highly-efficient operation | ∕⎯ S101 |

↓

| adjusting a start and stop state of the power generation device and a charge and discharge state of the at least one energy storage system according to a total power consumption of the main motor and the auxiliary device | ∕⎯ S102 |

FIG. 6

ELECTRICALLY-DRIVEN PUMPING SYSTEM AND DRIVING METHOD THEREOF

CROSS REFERENCE TO RELATED APPLICATION

This application is a national phase application of International Application No. PCT/CN2022/076321, filed on Feb. 15, 2022, the contents of which are incorporated by reference in its entirety.

TECHNICAL FIELD

Embodiments of the present disclosure relate to an electrically-driven pumping system and a driving method thereof.

BACKGROUND

With the continuous development of oil and gas exploitation technology, electrically-driven devices are more and more widely applied in the field of oil and gas exploitation, due to the advantages such as high power, energy conservation and environmental protection, light weight and small volume. Electrically-driven device generally uses electric power to drive a motor, and then uses the motor to drive various functional components to achieve various functions. For example, the motor may drive a fracturing pump to pressurize a low-pressure fracturing fluid into a high-pressure fracturing fluid; for another example, the motor may drive a lubrication pump to drive the lubrication fluid to lubricate a plunger pump.

Electrically-driven devices commonly used in the field of oil and gas exploitation may include electrically-driven pumping devices, such as electrically-driven cementing devices, electrically-driven acidizing fracturing devices, electrically-driven fracturing devices. These devices are usually powered by power grid, or power generation devices.

SUMMARY

The embodiments of the present disclosure provide an electrically-driven pumping system and a driving method thereof. The electrically-driven pumping system may supply power to an energy storage unit through a generator, and the energy storage unit supplies power to the motor, and a standby power supply is provided, which may avoid the device shutdown caused by power failure of the power supply device and the risk of operation interruption. In addition, the motor in the pumping device is driven by a frequency converter, which may realize stepless speed regulation; besides, in this technical solution, the internal combustion engine of the generator may always stay in an economic working condition, continuously work at the rated power and rated speed, and the combustion thermal efficiency is continuously maintained in the high-efficiency range.

At least one embodiment of the present disclosure provides an electrically-driven pumping system, which includes: a power generation device; at least one energy storage system, including an energy storage unit; a main motor; a pumping device, connected to the main motor and configured to pump fluid by using a mechanical power output by the main motor; an auxiliary device; and a first transformer, including an input end, a first output end, and a second output end, the power generation device is connected to the energy storage unit, the input end of the first transformer is connected to the energy storage unit, the first output end of the first transformer is electrically connected to the main motor, and the second output end of the first transformer is electrically connected to the auxiliary device.

For example, the electrically-driven pumping system provided by an embodiment of the present disclosure further includes: a first inverter, one end of the first inverter being connected to the first output end of the first transformer, and another end of the first inverter being connected to the main motor, the first inverter is configured to convert a direct current output from the first output end of the first transformer into an alternating current, the power generation device includes a prime motor and a direct current generator, and the prime motor is connected to the direct current generator and configured to drive the direct current generator to generate a direct current.

For example, the electrically-driven pumping system provided by an embodiment of the present disclosure further includes: a second transformer, including an input end and an output end; a control system; and a sensor, the input end of the second transformer is connected to the energy storage unit, and the output end of the second transformer is connected to the control system and the sensor.

For example, the electrically-driven pumping system provided by an embodiment of the present disclosure further includes: a second inverter, including an input end and an output end, input end of the second inverter is connected to the second output end of the first transformer, and the output end of the second inverter is connected to the auxiliary device.

For example, the electrically-driven pumping system provided by an embodiment of the present disclosure further includes: a bidirectional converter, including a first end, a second end, and a third end, the first end of the bidirectional converter is connected to the power generation device, the second end of the bidirectional converter is connected to the energy storage unit, and the third end of the bidirectional converter is connected to the input end of the first transformer, the bidirectional converter is configured to convert an alternating current input from the first end into a direct current and output the direct current through the second end, and convert a direct current input from the second end into an alternating current and output the alternating current through the third end, the power generation device includes a prime motor and an alternating current generator, the prime motor is connected to the alternating current generator and configured to drive the alternating current generator to generate an alternating current.

For example, the electrically-driven pumping system provided by an embodiment of the present disclosure further includes: a control system; a sensor; and a third inverter, one end of the third inverter being connected to the second output end of the first transformer, and another end of the third inverter being connected to the control system and the sensor, the third inverter is configured to convert an alternating current output from the first output end of the first transformer into a direct current.

For example, the electrically-driven pumping system provided by an embodiment of the present disclosure further includes: a first frequency converter, one end of the first frequency converter being connected to the first output end of the first transformer, and another end of the first frequency converter being connected to the main motor.

For example, in the electrically-driven pumping system provided by an embodiment of the present disclosure, the prime motor includes at least one of an internal combustion engine and a turbine engine.

For example, in the electrically-driven pumping system provided by an embodiment of the present disclosure, the auxiliary device includes: a first auxiliary motor; and a first auxiliary component, the second output end of the first transformer is connected to the first auxiliary motor, the first auxiliary motor is connected to the first auxiliary component and configured to drive the first auxiliary component.

For example, in the electrically-driven pumping system provided by an embodiment of the present disclosure, the first auxiliary component includes at least one selected from a lubrication pump, a heat dissipation pump, a hydraulic pump, a liquid supply pump, a centrifugal pump, a gear pump, an agitator, and a rotor pump.

For example, in the electrically-driven pumping system provided by an embodiment of the present disclosure, the auxiliary device further includes: a second frequency converter; a second auxiliary motor; and a second auxiliary component, one end of the second frequency converter is connected to the second output end of the first transformer, another end of the second frequency converter is connected to the second auxiliary motor, and the second auxiliary motor is connected to the second auxiliary component and configured to drive the second auxiliary component.

For example, in the electrically-driven pumping system provided by an embodiment of the present disclosure, the second auxiliary component includes at least one selected from a lubrication pump, a heat dissipation pump, a hydraulic pump, a liquid supply pump, a centrifugal pump, a gear pump, an agitator, and a rotor pump.

For example, in the electrically-driven pumping system provided by an embodiment of the present disclosure, the energy storage unit includes at least one of a chemical cell and a capacitor.

For example, in the electrically-driven pumping system provided by an embodiment of the present disclosure, the at least one energy storage system includes a plurality of energy storage systems, and the plurality of energy storage systems are connected in parallel between the power generation device and the first transformer.

For example, the electrically-driven pumping system provided by an embodiment of the present disclosure further includes: a diverter switch, including an input end, a first output end, and a second output end, the input end of the diverter switch is connected to the power generation device, the first output end of the diverter switch is connected to the energy storage system, and the second output end of the diverter switch is connected to the first transformer.

For example, the electrically-driven pumping system provided by an embodiment of the present disclosure further includes: a power management system, connected to the energy storage unit, and configured to monitor a state of the energy storage unit and manage the energy storage unit.

For example, the electrically-driven pumping system provided by an embodiment of the present disclosure further includes: a remote controller, the power generation device includes a power generation device controller, the control system is communicated and connected with the power generation device controller, the sensor, and the power management system, respectively, and the remote controller is communicated and connected with the control system.

At least one embodiment of the present disclosure further provides a driving method of the abovementioned electrically-driven pumping system, which includes: controlling the power generation device to be in a state of highly-efficient operation; and adjusting a start and stop state of the power generation device and a charge and discharge state of the at least one energy storage system according to a total power consumption of the main motor and the auxiliary device.

For example, in the driving method of the electrically-driven pumping system provided by an embodiment of the present disclosure, adjusting the charge and discharge state of the at least one energy storage system according to the total power consumption of the main motor and the auxiliary device includes: when the total power consumption of the main motor and the auxiliary device is greater than a power of power supply of the at least one energy storage system, controlling the power generation device and the at least one energy storage system to simultaneously supply power to the main motor and the auxiliary device; when the total power consumption of the main motor and the auxiliary device is less than the power of power supply of the at least one energy storage system, and an electric quantity of the at least one energy storage system is greater than a preset proportion of a power capacity of the at least one energy storage system, controlling the at least one energy storage system to discharge and turning off the power generation device; and when the total power consumption of the main motor and the auxiliary device is less than the power of power supply of the at least one energy storage system, and an electric quantity of the at least one energy storage system is less than the preset proportion of the power capacity of the at least one energy storage system, controlling the at least one energy storage system to discharge, and starting the power generation device to charge the at least one energy storage system.

For example, in the driving method of the electrically-driven pumping system provided by an embodiment of the present disclosure, the preset proportion is 20%.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus do not limit present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect," "connected," etc., are not intended to define a physical connection or a mechanical connection, but may comprise an electrical connection which is direct or indirect.

In the field of oil and gas exploitation, the diesel engine in the traditional diesel drive device has low efficiency, and needs to cooperate with a gearbox, and is then connected to a plunger pump through the gearbox; however, the gear speed ratio of high-power gearbox is discontinuous, which cannot realize stepless speed regulation, and cannot satisfy the requirement of fine adjustment at flow during fine operation. Moreover, during the actual operation process, the load rate of diesel engine is determined by the actual working condition, which is usually not the economic load condition of diesel engine, and the frequent switching of the diesel engine between the idle speed and the rated speed would increase the loss.

With the continuous development of electrically-driven technology, electrically-driven devices are becoming more and more popular in oil and gas exploitation well sites. However, because the oil and gas exploitation well sites are generally located in remote areas where power supply facilities are inadequate, and building a power grid is complex; as such, the use of electrically-driven devices is limited, and the requirement of flexible operation cannot be satisfied. Moreover, the electrically-driven device is powered by a power supply facility such as power grid or power generation device, and there is no buffer power supply for backup, once the power supply facility is powered off, the electrically-driven device would be shut down, resulting in operation interruption. In addition, under the circumstance that the electrically-driven device is powered by directly using the power generation device, because the power of the electrically-driven device is varied with different working conditions, the power generation device needs to output different powers, resulting in that the power generation device cannot be in a state of highly-efficient operation for a long time, which may cause a high power consumption and poor fuel economy.

In this regard, the embodiments of the present disclosure provide an electrically-driven pumping system and a driving method thereof. The electrically-driven pumping system includes: a power generation device, at least one energy storage system, a main motor, a pumping device, an auxiliary device, and a first transformer. The respective energy storage system includes an energy storage unit, and the pumping device is connected to the main motor, and configured to pump fluid by using the mechanical power output by the main motor; the first transformer includes an input end, a first output end, and a second output end, the power generation device is connected to the energy storage unit, the input end of the first transformer is connected to the energy storage unit, the first output end of the first transformer is electrically connected to the main motor, and the second output end of the first transformer is electrically connected to the auxiliary device. As such, the electrically-driven pumping system may avoid problems, such as the shutdown of the main motor caused by power failure of the power generation device, and ensure a continuous operation. On the other hand, the electrically-driven pumping system may also supply power to the main motor and the auxiliary device at the same time through at least one energy storage system, and the power generation device may operate highly efficiently for a long time under the condition of load variation, which improves the fuel economy.

Hereinafter, the electrically-driven pumping system and the driving method thereof provided by the embodiments of the present disclosure will be described in detail below in combination with the accompanying drawings.

Figure 1:
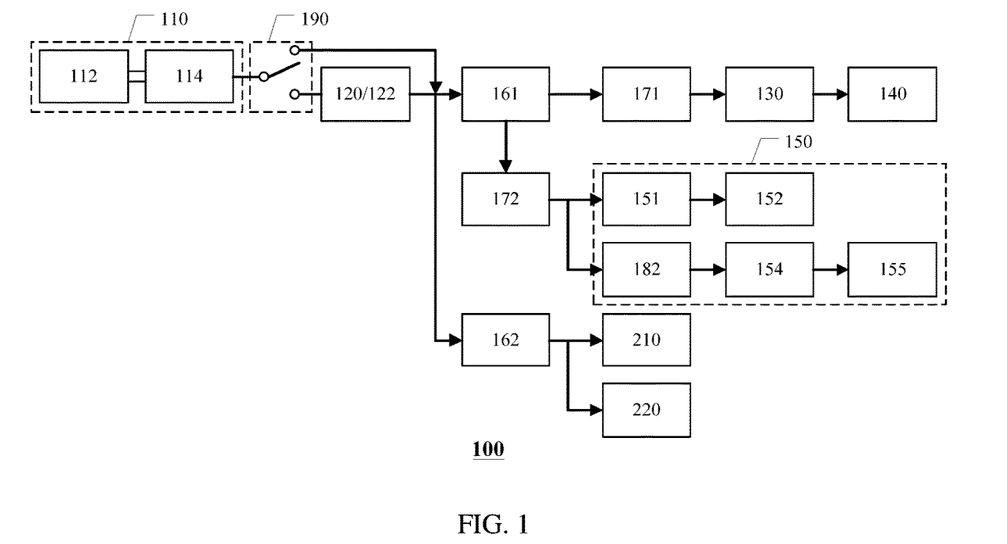
FIG. 1 is a schematic diagram of an electrically-driven pumping system provided by an embodiment of the present disclosure.

An embodiment of the present disclosure provides an electrically-driven pumping system. FIG. 1 is a schematic diagram of an electrically-driven pumping system provided by an embodiment of the present disclosure. As shown in FIG. 1, the electrically-driven pumping system 100 includes a power generation device 110, at least one energy storage system 120, a main motor 130, a pumping device 140, an auxiliary device 150, and a first transformer 161. The respective energy storage system 120 includes an energy storage unit 122; the pumping device 140 is connected to the main motor 130, and configured to pump fluid by using the mechanical power output by the main motor 130. The first transformer 161 includes an input end, a first output end, and a second output end, the power generation device 110 is connected to the energy storage unit 122, the input end of the first transformer 161 is connected to the energy storage unit 122, the first output end of the first transformer 161 is electrically connected to the main motor 130, and the second output end of the first transformer 161 is electrically connected to the auxiliary device 150. It should be noted that, the above-described power generation device being connected to the energy storage unit, includes the case in which the power generation device is directly connected to the energy storage unit, and also includes the case in which the power generation device is indirectly connected to the energy storage unit through other electrical elements; similarly, the input end of the first transformer being connected to the energy storage unit, includes the case in which the input end of the first transformer is directly connected to the energy storage unit, and also includes the case in which the input end of the first transformer is indirectly connected to the energy storage unit through other electrical elements.

In the electrically-driven pumping systems provided by the embodiments of the present disclosure, through disposing the above-described at least one energy storage system, the electrically-driven pumping system may avoid the issues such as the shutdown of the main motor caused by the power interruption or failure of the power generation device, thereby ensuring the operation to be continuous. In addition, because the input end of the first transformer is connected to the energy storage unit, the first output end of the first transformer is electrically connected to the main motor, and the second output end of the first transformer is electrically connected to the auxiliary device, the electrically-driven pumping system may supply power to various electric devices (e.g., the main motor and auxiliary device) requiring different voltages and different powers at the same time, thereby being capable of dealing with different working conditions. Moreover, because the various electric devices with different voltages and powers would generate different loads in the actual use, the electrically-driven pumping system may further make the power generation device operate highly efficiently for a long time under the condition of load variation through the at least one energy storage system, which improves the fuel economy.

On the other hand, in the electrically-driven pumping system, the generator in the power generation device may flexibly select the form of piston or turbine shaft, and thus have high flexibility and economy; the fuel of the prime motor in the power generation device may be oil (such as, diesel oil, bio oil, etc.), and may also be natural gas (such as compressed natural gas (CNG), liquefied natural gas (LNG), well gas, pipeline gas, etc.), hydrogen or hydrogen containing mixtures, or other fuels containing carbon or hydrogen, therefore, the use of these low-carbon fuels for the prime motor in the power generation device may reduce carbon emission and is conducive to environmental protection.

In some examples, when the total power consumption of the main motor and auxiliary devices is less than the power of power supply of the at least one energy storage system, and the electric quantity of the at least one energy storage system is greater than the preset proportion (such as 20%) of the power capacity of the at least one energy storage system, the at least one energy storage system is controlled to discharge, and the power generation device is turned off; when the total power consumption of the main motor and auxiliary device is less than the power of power supply of the at least one energy storage system, and the electric quantity of the at least one energy storage system is less than the preset proportion (such as 20%) of the power capacity of the at least one energy storage system, the at least one energy storage system is controlled to discharge, and the power generation device is started and charge the at least one energy storage system. As such, the electrically-driven pumping system may make the power generation device operate highly efficiently for a long time under the condition of ensuring sufficient power supply and coping with different loads. It should be noted that, when the total power consumption of the main motor and the auxiliary device is greater than the power of power supply of the at least one energy storage system, the power generation device and the at least one energy storage system may be controlled to simultaneously supply power to the main motor and the auxiliary device. In addition, the above-described preset proportion may also be set according to the actual situation.

It should be noted that, the above-described working mode is merely an example to illustrate that the electrically-driven pumping device provided by the embodiments of the present disclosure may realize the highly efficient operation of the power generation device for a long time, and the working mode of the electrically-driven pumping device of the embodiments of the present disclosure include but is not limited to this.

In some examples, as shown in FIG. 1, the electrically-driven pumping system 100 further includes a first inverter 171, one end of the first inverter 171 is connected to the first output end of the first transformer 161, and another end of the first inverter 171 is connected to the main motor 130. The first inverter 171 is configured to convert a direct current output from the first output end of the first transformer 161 into an alternating current. The power generation device 110 includes a prime motor 112 and a direct current generator 114, the prime motor 112 is connected to the direct current generator 114, and configured to drive the direct current generator 114 to generate direct current. In the electrically-driven pumping system provided in this example, under the circumstance that the power generation device is a direct current power generation device, the first inverter is configured to convert the direct current output from the first output end of the first transformer into alternating current, so as to drive the main motor that needs to be driven by alternating current.

In some examples, as shown in FIG. 1, the above-described main motor 130 may be a variable frequency motor. As such, the first inverter may convert the direct current output from the first output end of the first transformer into variable frequency alternating current. As such, the electrically-driven pumping system may realize stepless speed regulation, continuous change of the speed and enhancement of transmission efficiency.

For example, the above-described variable frequency motor may be a variable frequency motor in the form of three-phase asynchronous, permanent magnet, variable frequency all-in-one machine, and so on.

In some examples, as shown in FIG. 1, the prime motor 112 may be connected to the generator 114 through a coupling. For example, the coupling may be a transmission shaft, an elastic coupling, and so on.

In some examples, the above-described pumping device 140 includes a plunger pump, and the main motor 130 is connected to the plunger pump through a coupling, so as to realize fluid pumping. Of course, the embodiments of the present disclosure include but are not limited to this, and the above-described pumping device may also adopt other types of pumping devices.

In some examples, the above-described prime motor 112 includes at least one of an internal combustion engine and a turbine engine.

For example, the above-described prime motor 112 may be diesel engine.

In some examples, as shown in FIG. 1, the electrically-driven pumping system 100 further includes a second transformer 162, a control system 210, and a sensor 220. The second transformer 162 includes an input end and an output end. The input end of the second transformer 162 is connected to the energy storage unit 122, and the output end of the second transformer 162 is connected to the control system 210 and the sensor 220. Because the control system and the sensor need low-voltage drive, the electrically-driven pumping device may flexibly increase or decrease the voltage by setting the above-described second transformer, so as to satisfy the voltage conditions required for the operations of various electric devices.

In some examples, as shown in FIG. 1, the electrically-driven pumping system 100 further includes a second inverter 172, the second inverter 172 includes an input end and an output end, the input end of the second inverter 172 is connected to the second output end of the first transformer 161, and the output end of the second inverter 172 is connected to the auxiliary device 150. As such, under the circumstances that the power generation device is a direct current power generation device, the second inverter is configured to convert the direct current output from the first output end of the first transformer into alternating current, so as to drive the auxiliary device that need to be driven by alternating current.

In some examples, as shown in FIG. 1, the auxiliary device 150 includes a first auxiliary motor 151 and a first auxiliary component 152, the second output end of the first transformer 161 is connected to the first auxiliary motor 151, and the first auxiliary motor 151 is connected to the first auxiliary component 152 and configured to drive the first auxiliary component 152. It should be noted that, when the electrically-driven pumping system includes the above-described second inverter, the first auxiliary motor may be connected to the second output end of the first transformer through the second inverter.

In some examples, the first auxiliary component 152 includes at least one selected from a lubrication pump, a heat dissipation pump, a hydraulic pump, a liquid supply pump, a centrifugal pump, a gear pump, an agitator, and a rotor pump. As such, the auxiliary device may realize various types of auxiliary functions, such as lubrication function, heat dissipation function, and so on.

For example, the first auxiliary motor 151 may be a fixed frequency motor or a variable frequency motor, and the embodiments of the present disclosure are not limited thereto herein.

In some examples, the above-described energy storage unit 122 includes at least one of a chemical cell and a capacitor. As such, the above-described energy storage unit has fast charge and discharge capability and relatively large energy density. Of course, the embodiments of the present disclosure include but are not limited to this, and the above-described energy storage unit may also adopt other energy storage methods.

In some examples, as shown in FIG. 1, the electrically-driven pumping device 100 further includes a diverter switch 190 including an input end, a first output end, and a second output end, the input end of the diverter switch 190 is connected to the power generation device 110, the first output end of the diverter switch 190 is connected to the energy storage system 120, and the second output end of the diverter switch 190 is connected to the first transformer 161. As such, when the diverter switch connects the input end to the first output end, the power generated by the power generation device may be used for charging the energy storage system; when the diverter switch connects the input end to the second output end, the power generated by the power generation device may directly drive the main motor and the auxiliary device through the first transformer. As such, the power generation device and the energy storage system may serve as the backup for each other, and power may be supplied through power generation device when the energy storage system breaks down. In addition, when the total power consumption of the main motor and the auxiliary device is greater than the power of power supply of at least one energy storage system, the power generation device and the at least one energy storage system may be controlled to simultaneously supply power to the main motor and the auxiliary device through connecting the input end to the second output end by the diverter switch.

Figure 2:
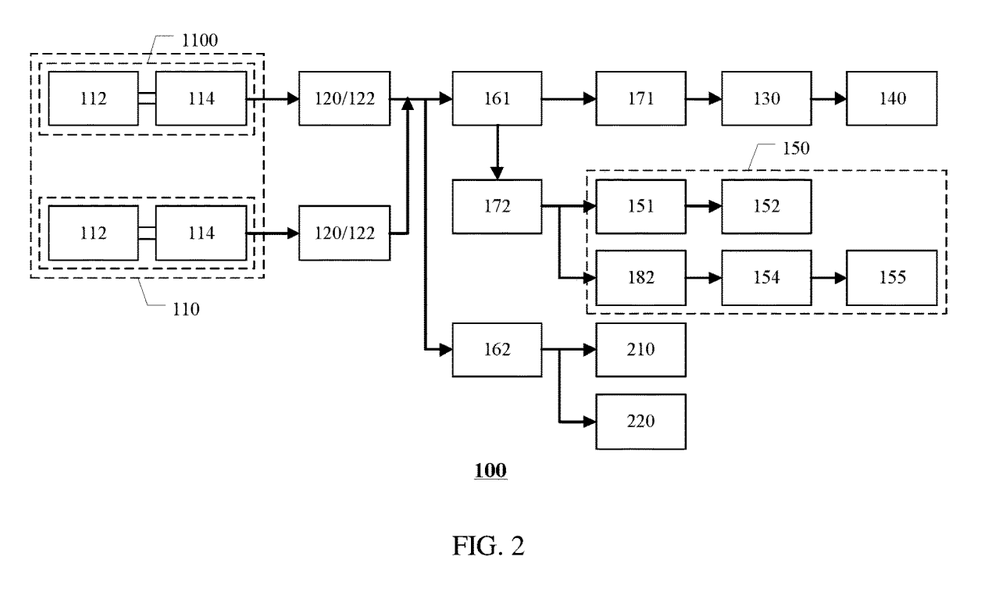
FIG. 2 is a schematic diagram of another electrically-driven pumping system provided by an embodiment of the present disclosure.

FIG. 2 is a schematic diagram of another electrically-driven pumping system provided by an embodiment of the present disclosure. As shown in FIG. 2, the electrically-driven pumping system 100 includes a plurality of energy storage systems 120, that is to say, the above-described at least one energy storage system 120 is a plurality of energy storage systems 120. In this case, a plurality of energy storage systems 120 are connected in parallel between the power generation device 110 and the first transformer 161. As such, on one hand, a plurality of energy storage systems may increase the power capacity of the electrically-driven pumping system; on the other hand, the plurality of energy storage systems may serve as the backup for each other, when one of the energy storage systems fails, other energy storage systems may still ensure the operation to be continuous.

In some examples, as shown in FIG. 2, the power generation device 110 may include a plurality of sub-power-generation devices 1100, and the plurality of sub-power-generation devices 1100 and the plurality of energy storage systems 120 are disposed in a one-to-one correspondence. Of course, the embodiments of the present disclosure include but are not limited to this.

Figure 3:
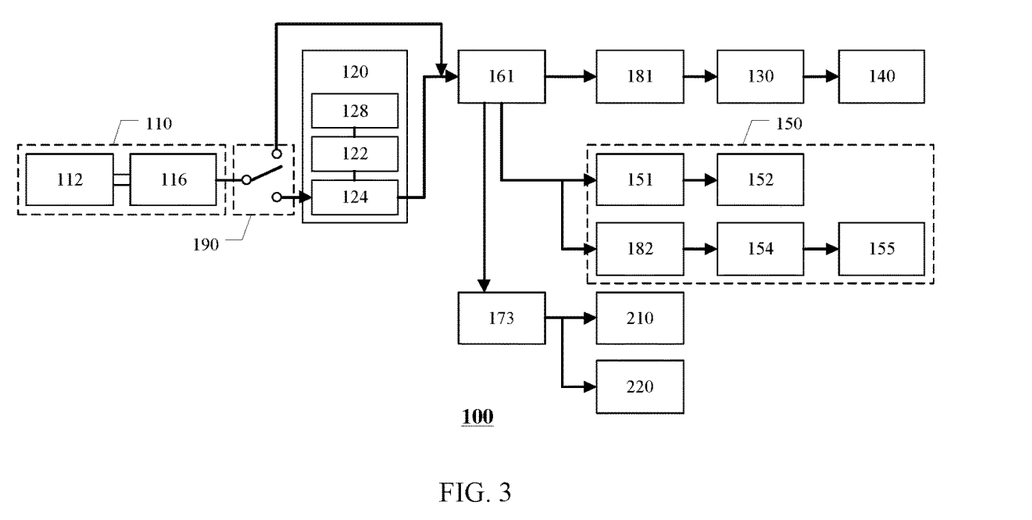
FIG. 3 is a schematic diagram of another electrically-driven pumping system provided by an embodiment of the present disclosure.

FIG. 3 is a schematic diagram of another electrically-driven pumping system provided by an embodiment of the present disclosure. As shown in FIG. 3, the electrically-driven pumping system 100 includes a power generation device 110, at least one energy storage system 120, a main motor 130, a pumping device 140, an auxiliary device 150, and a first transformer 161. The respective energy storage system 120 includes an energy storage unit 122 and a bidirectional converter 124; the pumping device 140 is connected to the main motor 130 and configured to pump fluid by using the mechanical power output by the main motor 130. The first transformer 161 includes an input end, a first output end, and a second output end, the power generation device 110 is connected to the energy storage unit 122, the input end of the first transformer 161 is connected to the energy storage unit 122, the first output end of the first transformer 161 is electrically connected to the main motor 130, and the second output end of the first transformer 161 is electrically connected to the auxiliary device 150.

As shown in FIG. 3, the bidirectional converter 124 includes a first end, a second end, and a third end; the first end of the bidirectional converter 124 is connected to the power generation device 110, the second end of the bidirectional converter 124 is connected to the energy storage unit 122, and the third end of the bidirectional converter 124 is connected to the input end of the first transformer 161; the bidirectional converter 124 is configured to convert the alternating current input from the first end into direct current and output the direct current through the second end, and convert the direct current input from the second end into alternating current and output the alternating current through the third end. The power generation device 110 includes a prime motor 112 and an alternating current generator 116, the prime motor 112 is connected to the alternating current generator 116 and configured to drive the alternating current generator 116 to generate alternating current. As such, the electrically-driven pumping system may convert the alternating current provided by the power generation device into a direct current through the bidirectional converter and store the direct current in the energy storage unit, and may also convert the direct current output from the energy storage unit into an alternating current through the bidirectional converter, and further drive the main motor and the auxiliary device that need to be driven by alternating current.

In some examples, the above-described prime motor 112 may also include at least one of an internal combustion engine and a turbine engine.

In some examples, as shown in FIG. 3, the electrically-driven pumping system 100 further includes a control system 210, a sensor 220, and a third inverter 173; one end of the third inverter 173 is connected to the second output end of the first transformer 161, and another end of the third inverter 173 is connected to the control system 210 and the sensor 220, the third inverter 173 is configured to convert the alternating current output from the second output end of the first transformer 161 into direct current, so as to drive the control system and the sensor that need to be driven by direct current.

In some examples, as shown in FIG. 3, the electrically-driven pumping system 100 further includes a first frequency converter 181; one end of the first frequency converter 181 is connected to the first output end of the first transformer 161, and another end of the first frequency converter 181 is connected to the main motor 130. As such, the first frequency converter may convert the direct current output from the first output end of the first transformer into a variable frequency alternating current. As such, the electrically-driven pumping system may realize stepless speed regulation, continuous change of speed and enhancement of transmission efficiency.

In some examples, as shown in FIG. 3, the above-described main motor 130 may be a variable frequency motor.

In some examples, as shown in FIG. 3, the auxiliary device 150 includes a first auxiliary motor 151 and a first auxiliary component 152, the second output end of the first transformer 161 is connected to the first auxiliary motor 151, and the first auxiliary motor 151 is connected to the first auxiliary component 152 and configured to drive the first auxiliary component 152. It should be noted that, when the electrically-driven pumping system includes the above-described second inverter, the first auxiliary motor may be connected to the second output end of the first transformer through the second inverter.

In some examples, the first auxiliary component 152 includes at least one selected from a lubrication pump, a heat dissipation pump, a hydraulic pump, a liquid supply pump, a centrifugal pump, a gear pump, an agitator, and a rotor pump. As such, the auxiliary device may realize various types of auxiliary functions, such as lubrication function, heat dissipation function, and so on.

For example, the first auxiliary motor 151 may be a fixed frequency motor or a variable frequency motor, and the embodiments of the present disclosure are not limited thereto herein.

In some examples, as shown in FIG. 3, the auxiliary device 150 further includes a second frequency converter 182, a second auxiliary motor 154, and a second auxiliary component 155; one end of the second frequency converter 182 is connected to the second output end of the first transformer 161, and another end of the second frequency converter 182 is connected to the second auxiliary motor 154, the second auxiliary motor 154 is connected to the second auxiliary component 155 and configured to drive the second auxiliary component 155. As such, through the above-described second frequency converter, the above-described second auxiliary motor may also realize stepless speed regulation, continuous change of speed and enhancement of transmission efficiency.

In some examples, the second auxiliary component 155 may also include at least one selected from a lubrication pump, a heat dissipation pump, a hydraulic pump, a liquid supply pump, a centrifugal pump, a gear pump, an agitator, and a rotor pump. As such, the auxiliary device may realize various types of auxiliary functions, such as lubrication function, heat dissipation function, and so on.

In some examples, the above-described energy storage unit 122 includes at least one of a chemical cell and a capacitor. As such, the above-described energy storage unit has fast charge and discharge capability and relatively large energy density. Of course, the embodiments of the present disclosure include but are not limited to this, and the above-described energy storage unit may also adopt other energy storage methods.

In some examples, as shown in FIG. 3, the electrically-driven pumping device 100 further includes a diverter switch 190 including an input end, a first output end, and a second output end, the input end of the diverter switch 190 is connected to the power generation device 110, the first output end of the diverter switch 190 is connected to the energy storage system 120, and the second output end of the diverter switch 190 is connected to the first transformer 161. As such, when the diverter switch connects the input end to the first output end, the power generated by the power generation device may be used for charging the energy storage system; when the diverter switch connects the input end to the second output end, the power generated by the power generation device may drive the main motor and auxiliary device directly through the first transformer. As such, the power generation device and the energy storage system may serve as the backup for each other, and power may be supplied through the power generation device when the energy storage system breaks down. In addition, when the total power consumption of the main motor and the auxiliary device is greater than the power of power supply of the at least one energy storage system, the power generation device and at least one energy storage system may be controlled to simultaneously supply power to the main motor and the auxiliary device through connecting the input end to the second output end by the diverter switch.

In some examples, as shown in FIG. 3, the energy storage system 120 further includes a power management system 128, and the power management system 128 is connected to the energy storage unit 122, and configured to monitor the state of the energy storage unit 122 and manage the energy storage unit 122.

For example, the power management system may include an energy storage unit protection module, and the energy storage unit protection module may set the charging timing of the energy storage unit. For example, when the electric quantity of the energy storage unit is less than 20% of the power capacity of the energy storage unit, a request signal is sent to request the power generation device to charge the energy storage unit.

Figure 4:
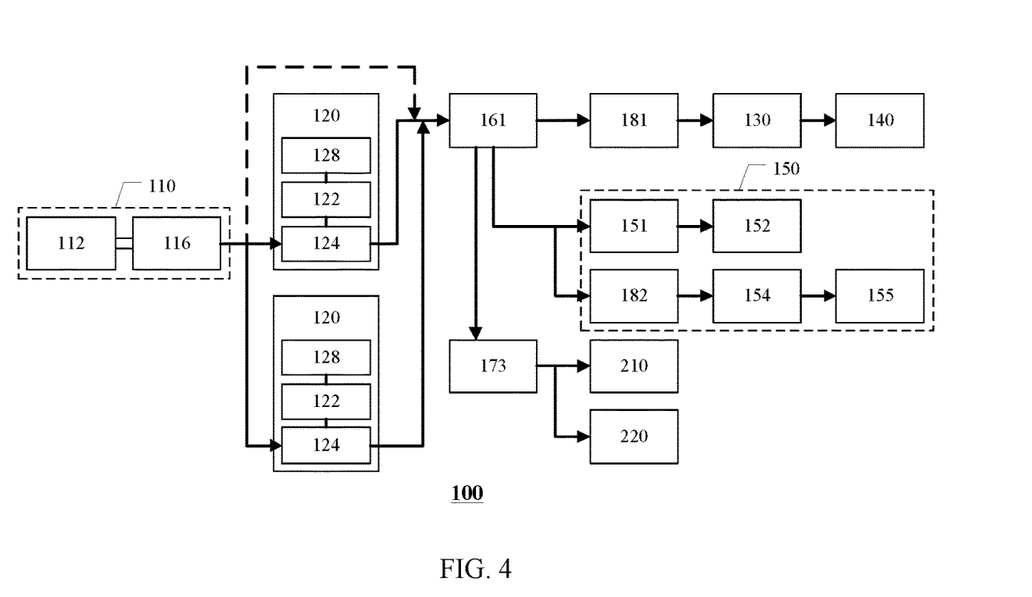
FIG. 4 is a schematic diagram of another electrically-driven pumping system provided by an embodiment of the present disclosure.

FIG. 4 is a schematic diagram of another electrically-driven pumping system provided by an embodiment of the present disclosure. As shown in FIG. 4, the electrically-driven pumping system 100 includes a plurality of energy storage systems 120, that is to say, the above-described at least one energy storage system 120 is a plurality of energy storage systems 120. In this case, a plurality of energy storage systems 120 are connected in parallel between the power generation device 110 and the first transformer 161. As such, on the one hand, a plurality of energy storage systems may increase the power capacity of the electrically-driven pumping system; on the other hand, the plurality of energy storage systems may serve as the backup for each other, and when one of the energy storage systems breaks down, other energy storage systems may still ensure the operation to be continuous.

Figure 5:
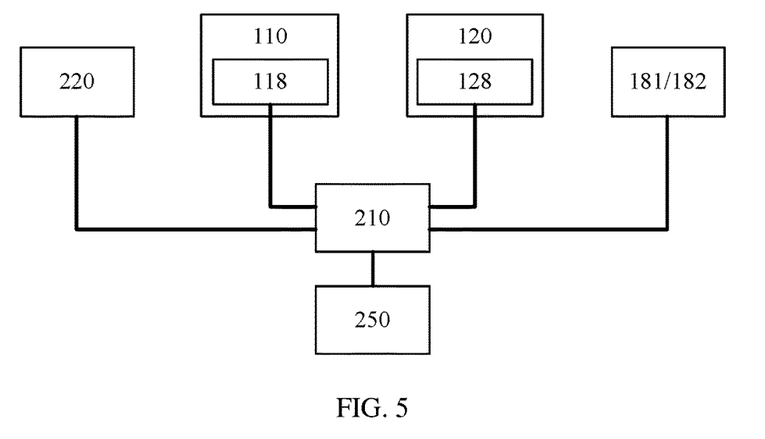
FIG. 5 is a schematic diagram of another electrically-driven pumping system provided by an embodiment of the present disclosure.

FIG. 5 is a schematic diagram of another electrically-driven pumping system provided by an embodiment of the present disclosure. As shown in FIG. 5, the electrically-driven pumping device 100 further includes a remote controller 250, the power generation device 110 includes a power generation device controller 118, the control system 210 is communicated and connected with the power generation device controller 118, the sensor 220 and the power management system 128, respectively, and the remote controller 250 is communicated and connected with the control system 210. As such, the control system may obtain the operating parameters of the above-described various devices (e.g., power generation device, pumping device, auxiliary device, etc.) through various sensors, and control according to these operating parameters; in addition, the above-described control system may also estimate the power consumptions of various devices through the above-described operating parameters, and further estimate the total power consumption. In addition, the electrically-driven pumping device may also realize remote control through the remote controller.

For example, the power generation device controller includes a prime motor protection module, because the prime motor may adopt internal combustion engine and turbine engine which usually needs preheating, turning gear starting, idle heating, etc., different machine models also needs idle lubrication, heat dissipation, shutdown and turning gear heat dissipation, continuous heat dissipation of heat sink, etc. at the end of operation. Therefore, through the above-described prime motor protection module, the power generation device controller may automatically determine the reserved protection time and avoid failure such as damage of overheating or damage of cold starting, etc.; in addition, the power generation device controller may further monitor the temperature of key parts of the prime motor, the pressure of the lubrication system and the rotate speed of the internal combustion engine, etc., and automatically determine the buffer protection time, at the same time, satisfy the power demand of the system and avoid the situation that the generator still cannot be started when power generation is required.

For example, the control system may obtain the current, voltage, temperature, residual quantity, alarm information, etc. of the energy storage unit through the power management system; the control system obtains the current, voltage, frequency, temperature, rotate speed, alarm information, liquid pipeline pressure, oil position and height, etc. of the generator through the power generation device controller; after the control system obtains the alarm information, the alarm information may be displayed on local display interface, and may also be displayed on the control interface of remote controller. Therefore, in the case that abnormal condition such as overheating of the device, overspeed of the internal combustion engine, and overpressure of the discharge pipeline of the device is occurred, the control system may disconnect the switch between the power supply device and the power unit (e.g., the motor), and stop power generation and power supply, thereby avoiding the damage of device, overpressure accident, etc.

In some examples, as shown in FIG. 5, the above-described control system 210 may also be in communication with the above-described first frequency converter 181 and second frequency converter 182, so as to control the rotate speeds of the main motor 130 and the second auxiliary motor 154.

In some examples, the above-described communication includes communication through wired connection (e.g., wire, optical fiber, etc.), and also includes communication through wireless connection (e.g., Wi-Fi, mobile network).

In some examples, the above-described control system and the remote controller may include a storage medium and a processor; the storage medium is used for storing computer programs; the processor is used for executing the computer program in the storage medium to realize various control operations.

For example, the above-described storage medium may be volatile memory and/or non-volatile memory. The volatile memory may include, for example, random access memory (RAM) and/or cache memory (cache), and so on. The non-volatile memory may include, for example, read only memory (ROM), hard disk, flash memory, and so on.

For example, the above-described processor may be a central processing unit (CPU) or other types of processing devices with data processing capability and/or instruction executing capability, such as microprocessor, programmable logic controller (PLC), and so on.

Of course, in the electrically-driven pumping device provided by the embodiments of the present disclosure, the above-described control system and remote controller may also be implemented by software, so as to be executed by various types of processors. For example, an identified executable code module may include one or more physical or logical blocks of computer instructions, which may be constructed as objects, procedures, or functions, for example. Even so, the executable codes of the identified module do not need to be physically located together, instead, the executable codes of the identified module may include different instructions stored on different physical locations, when these instructions are logically combined together, they constitute a module and realize the specified purpose of the module.

In fact, executable code modules may be a single instruction or multiple instructions, and may even be distributed on multiple different code segments, distributed in different programs, and distributed across multiple memory devices. Similarly, the operation data may be identified within the module and may be implemented in any appropriate form and organized in any appropriate type of data structure. The operation data may be collected as a single data set, or may be distributed in different locations (including on different memory devices), and may at least partially and merely serve as electronic signal existing on system or network.

When the module may be realized by software, considering the level of existing hardware technology, person skilled in the art may build corresponding hardware circuit to realize the corresponding functions using the module that may be realized by software, without considering the cost, the hardware circuit include conventional very-large-scale integration (VLSI) circuits or a gate array, and existing semiconductor devices (e.g., logic chips, transistors or the like) or other discrete elements. The module may also be implemented with programmable hardware equipment, such as field programmable gate array, programmable array logic, programmable logic equipment, and so on.

The electrically-driven pumping device provided by the embodiments of the present disclosure may realize the following working modes:

Working mode 1: the power generation device continuously supplies power to the energy storage system, the energy storage system supplies power to the electric devices, such as the main motor, the auxiliary device, etc., and the prime motor in the power generation device operates continuously and highly efficiently.

Working mode 2: the power generation device continuously supplies power to the electric devices, such as the main motor, the auxiliary device, etc., excess power is used for charging the energy storage system, the energy storage system stores power, and the prime motor in the power generation device operates highly efficiently most of the time.

Working mode 3: the power generation device and the energy storage system jointly supply power to the electric devices, such as the main motor, the auxiliary device, etc., so as to ensure the high-power working demand of the electric devices, the prime motor in the power generation device ensure highly-efficient operation, and the energy storage system provides additional power.

Working mode 4: external power supply facilities supply power to the energy storage system, and the prime motor in the power generation device serve as backup. For example, the above-described external power supply facilities may be public power grid or small local power grid.

In some examples, the above-described pumping device may be in the form of vehicle mounted, skid mounted, semi-trailer, etc.; in addition, the pumping device and the main engine may be integrated on a same carrier or skid. As such, the electrically-driven pumping system may select and combine a variety of device forms according to the actual working conditions, and is also convenient for being transported to the respective well sites, without being limited by the power supply conditions and locations.

In some examples, the above-described power generation device may be in the form of vehicle mounted, skid mounted, semi-trailer, etc.; when the power generation device is in the form of vehicle mounted, the prime motor may also be the chassis engine of the carrier, and the chassis engine may drive the generator to generate power through a special power take off.

Figure 6:
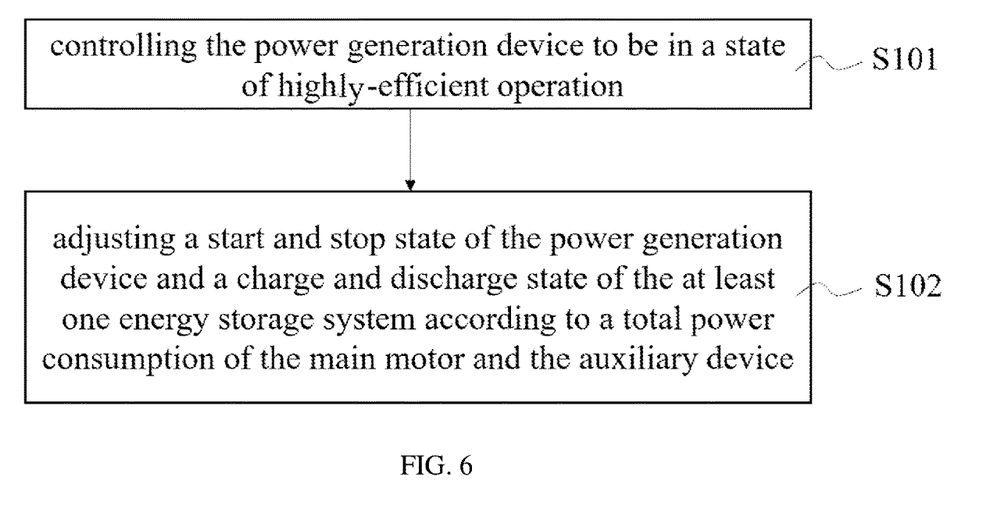
FIG. 6 is a schematic diagram illustrating a driving method of an electrically-driven pumping system provided by an embodiment of the present disclosure.

An embodiment of the present disclosure further provides a driving method of the electrically-driven pumping system. FIG. 6 is a schematic diagram illustrating a driving method of an electrically-driven pumping system provided by an embodiment of the present disclosure. As shown in FIG. 6, the driving method of the electrically-driven pumping system includes the following steps:

Step S101: controlling the power generation device to be in the state of highly-efficient operation.

Step S102: adjusting the start and stop state of the power generation device and the charge and discharge state of the at least one energy storage system according to the total power consumption of the main motor and the auxiliary device.

In the driving method of the electrically-driven pumping system provided by the embodiments of the present disclosure, because the power generation device may be in the state of highly-efficient operation for a long time, the fuel economy is improved. Moreover, because the driving method may further adjust the start and stop state of the power generation device and the charge and discharge state of the at least one energy storage system according to the total power consumption of the main motor and the auxiliary device, the electric quantity in the energy storage system may be maintained within a certain range while the power generation device is in the state of highly-efficient operation. It should be noted that, the above-described "state of highly-efficient operation" means that the efficiency of the power generation device is more than 80% of the maximum efficiency of the power generation device. For example, when the power generation device adopts a gas turbine power generation device, and the maximum efficiency of the power generation device is 40%, the state of highly-efficient operation of the power generation device refers to the state in which the efficiency of the power generation device is greater than 32%.

In some examples, adjusting the charge and discharge state of the at least one energy storage system according to the power consumption of the main motor and the auxiliary device includes: when the total power consumption of the main motor and the auxiliary device is greater than the power of power supply of at least one energy storage system, controlling the power generation device and the at least one energy storage system to simultaneously supply power to the main motor and the auxiliary device; when the total power consumption of the main motor and the auxiliary device is less than the power of power supply of at least one energy storage system, and the electric quantity of the at least one energy storage system is greater than the preset proportion of the power capacity of at least one energy storage system, controlling the at least one energy storage system to discharge, and turning off the power generation device; and when the total power consumption of the main motor and the auxiliary device is less than the power of power supply of the at least one energy storage system, and the electric quantity of at least one energy storage system is less than the preset proportion of the power capacity of at least one energy storage system, controlling at least one energy storage system to discharge, and starting the power generation device and charging at least one energy storage system. As such, the driving method may ensure sufficient power supply under various different loads, while making the power generation device operate highly efficiently for a long time.

In some examples, the above-described proportion is 20%. Of course, the embodiments of the present disclosure include but are not limited to this, and the above-described preset proportion may be set according to actual requirements.

The following aspects should be noted:

(1) The drawings of the embodiments of the present disclosure are merely related to the structures that are related to the embodiments of the present disclosure, while other structures may refer to the common design.

(2) The features in the same embodiment and different embodiments of the present disclosure may be combined with each other without contradiction.

The above merely illustrates the specific embodiments of the disclosure, but the claimed scope of the disclosure is not limited thereto. Any variations or substitutions that may be readily achieved by person skilled in the art based on the scope of the disclosure should be included within the scope of the present disclosure. Therefore, the scope of the present disclosure should be subject to the scope of the claims.

The invention claimed is:

1. An electrically-driven pumping system, comprising:
a power generation device;
at least one energy storage system, comprising an energy storage unit and a bidirectional converter, comprising a first end, a second end, and a third end;
a main motor;
a pumping device, mechanically connected to the main motor and configured to pump fluid by using a mechanical power output by the main motor;
an auxiliary device; and
a first transformer, comprising an input end, a first output end, and a second output end,
wherein, the power generation device is electrically connected to the energy storage unit, the input end of the first transformer is electrically connected to the energy storage unit, the first output end of the first transformer is electrically connected to the main motor, and the second output end of the first transformer is electrically connected to the auxiliary device,
wherein, the first end of the bidirectional converter is electrically connected to the power generation device, the second end of the bidirectional converter is electrically connected to the energy storage unit, and the third end of the bidirectional converter is electrically connected to the input end of the first transformer, wherein, the bidirectional converter is configured to convert an alternating current input from the first end into a direct current and output the direct current through the second end, and convert a direct current input from the second end into an alternating current and output the alternating current through the third end.

2. The electrically-driven pumping system according to claim 1, further comprising:

a first inverter, one end of the first inverter being electrically connected to the first output end of the first transformer, and another end of the first inverter being electrically connected to the main motor, wherein, the first inverter is configured to convert a direct current output from the first output end of the first transformer into an alternating current, the power generation device comprises a prime mover and a direct current generator, and the prime mover is mechanically connected to the direct current generator and configured to drive the direct current generator to generate a direct current.

3. The electrically-driven pumping system according to claim 2, further comprising:

a second transformer, comprising an input end and an output end;

a control system; and a sensor, wherein, the input end of the second transformer is electrically connected to the energy storage unit, and the output end of the second transformer is electrically connected to the control system and the sensor.

4. The electrically-driven pumping system according to claim 2, further comprising:

a second inverter, comprising an input end and an output end, wherein, input end of the second inverter is electrically connected to the second output end of the first transformer, and the output end of the second inverter is electrically connected to the auxiliary device.

5. The electrically-driven pumping system according to claim 1, wherein, the power generation device comprises a prime mover and an alternating current generator, the prime mover is mechanically connected to the alternating current generator and configured to drive the alternating current generator to generate an alternating current.

6. The electrically-driven pumping system according to claim 4, further comprising:

a control system;

a sensor; and a third inverter, one end of the third inverter being electrically connected to the second output end of the first transformer, and another end of the third inverter being electrically connected to the control system and the sensor, wherein, the third inverter is configured to convert an alternating current output from the first output end of the first transformer into a direct current.

7. The electrically-driven pumping system according to claim 5, further comprising:

a first frequency converter, one end of the first frequency converter being electrically connected to the first output end of the first transformer, and another end of the first frequency converter being electrically connected to the main motor.

8. The electrically-driven pumping system according to claim 2, wherein, the prime mover comprises at least one of an internal combustion engine and a turbine engine.

9. The electrically-driven pumping system according to claim 1, wherein, the auxiliary device comprises:

a first auxiliary motor; and a first auxiliary component, wherein, the second output end of the first transformer is electrically connected to the first auxiliary motor, the first auxiliary motor is mechanically connected to the first auxiliary component and configured to drive the first auxiliary component.

10. The electrically-driven pumping system according to claim 9, wherein, the first auxiliary component comprises at least one selected from a lubrication pump, a heat dissipation pump, a hydraulic pump, a liquid supply pump, a centrifugal pump, a gear pump, an agitator, and a rotor pump.

11. The electrically-driven pumping system according to claim 1, wherein, the auxiliary device further comprises:

a second frequency converter;

a second auxiliary motor; and a second auxiliary component, wherein, one end of the second frequency converter is electrically connected to the second output end of the first transformer, another end of the second frequency converter is electrically connected to the second auxiliary motor, and the second auxiliary motor is mechanically connected to the second auxiliary component and configured to drive the second auxiliary component.

12. The electrically-driven pumping system according to claim 11, wherein, the second auxiliary component comprises at least one selected from a lubrication pump, a heat dissipation pump, a hydraulic pump, a liquid supply pump, a centrifugal pump, a gear pump, an agitator, and a rotor pump.

13. The electrically-driven pumping system according to claim 1, wherein, the energy storage unit comprises at least one of a chemical cell and a capacitor.

14. The electrically-driven pumping system according to claim 1, wherein, the at least one energy storage system comprises a plurality of energy storage systems, and the plurality of energy storage systems are electrically connected in parallel between the power generation device and the first transformer.

15. The electrically-driven pumping system according to claim 1, further comprising:

a diverter switch, comprising an input end, a first output end, and a second output end, wherein, the input end of the diverter switch is electrically connected to the power generation device, the first output end of the diverter switch is electrically connected to the energy storage system, and the second output end of the diverter switch is electrically connected to the first transformer.

16. The electrically-driven pumping system according to claim 3, wherein, the energy storage system further comprises:

a power management system, electrically connected to the energy storage unit, and configured to monitor a state of the energy storage unit and manage the energy storage unit.

17. The electrically-driven pumping system according to claim 16, further comprising:

a remote controller, wherein, the power generation device comprises a power generation device controller, the control system is in communication with the power generation device controller, a sensor, and the power management system, respectively, and the remote controller is in communication with the control system.

18. A method of driving the electrically-driven pumping system according to claim 1, comprising:
controlling the power generation device to be in a state of highly-efficient operation; and
adjusting a start and stop state of the power generation device and a charge and discharge state of the at least one energy storage system according to a total power consumption of the main motor and the auxiliary device.

19. The method of driving of the electrically-driven pumping system according to claim 18, wherein, adjusting the charge and discharge state of the at least one energy storage system according to the total power consumption of the main motor and the auxiliary device comprises:
when the total power consumption of the main motor and the auxiliary device is greater than a power of power supply of the at least one energy storage system, controlling the power generation device and the at least one energy storage system to simultaneously supply power to the main motor and the auxiliary device;
when the total power consumption of the main motor and the auxiliary device is less than the power of power supply of the at least one energy storage system, and an electric quantity of the at least one energy storage system is greater than a preset proportion of a power capacity of the at least one energy storage system, controlling the at least one energy storage system to discharge and turning off the power generation device; and
when the total power consumption of the main motor and the auxiliary device is less than the power of power supply of the at least one energy storage system, and an electric quantity of the at least one energy storage system is less than the preset proportion of the power capacity of the at least one energy storage system, controlling the at least one energy storage system to discharge, and starting the power generation device to charge the at least one energy storage system.

20. The method of driving of the electrically-driven pumping system according to claim 19, wherein, the preset proportion is 20%.

* * * * *